(12) United States Patent
Muratani

(10) Patent No.: US 6,804,375 B2
(45) Date of Patent: Oct. 12, 2004

(54) ELECTRONIC WATERMARK DETECTION APPARATUS AND METHOD

(75) Inventor: Hirofumi Muratani, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 606 days.

(21) Appl. No.: 09/891,298

(22) Filed: Jun. 27, 2001

(65) Prior Publication Data

US 2002/0021823 A1 Feb. 21, 2002

(30) Foreign Application Priority Data

Jun. 27, 2000 (JP) .................................... P2000-192358

(51) Int. Cl.[7] .............................................. G06K 9/00
(52) U.S. Cl. ...................... 382/100; 382/218; 382/205; 382/278; 382/282; 382/275; 382/308; 358/405
(58) Field of Search ................................ 382/100, 308, 382/195, 275, 205, 206, 218, 296, 298, 221, 278, 282; 283/113; 358/328, 405; 713/176, 172; 380/54, 200

(56) References Cited

U.S. PATENT DOCUMENTS

| | | | | |
|---|---|---|---|---|
| 6,094,483 A | * | 7/2000 | Fridrich et al. ................ | 380/28 |
| 6,108,434 A | * | 8/2000 | Cox et al. .................... | 382/100 |
| 6,208,735 B1 | * | 3/2001 | Cox et al. .................... | 380/54 |
| 6,282,300 B1 | * | 8/2001 | Bloom et al. ................. | 382/100 |
| 6,704,869 B2 | * | 3/2004 | Rhoads et al. ............... | 713/176 |
| 2003/0037075 A1 | * | 2/2003 | Hannigan et al. ........... | 707/500 |
| 2003/0039377 A1 | * | 2/2003 | Rhoads et al. ............... | 382/100 |
| 2003/0051255 A1 | * | 3/2003 | Bulman et al. .............. | 725/135 |

OTHER PUBLICATIONS

U.S. patent application Ser. No. 09/891,298, filed Jun. 27, 2001, pending.
U.S. patent application Ser. No. 09/984,669, filed Oct. 30, 2001, pending.

* cited by examiner

*Primary Examiner*—Bhavesh M. Mehta
*Assistant Examiner*—Barry Choobin
(74) *Attorney, Agent, or Firm*—Oblon, Spivak, McClelland, Maier & Neustadt, P.C.

(57) ABSTRACT

Electronic watermarks in digital documents can be detected, even if the content of the digital documents has been subjected to distortion or other attempts to hide or destroy the watermarks. A method involves inputting the distorted image and comparison information, the comparison information including at least one of the original image or information used for embedding the electronic watermark; dividing a domain of the original image into a plurality of patches, based on the comparison information; inputting affine parameters of a predetermined patch from among the patches in the original image; extracting a patch candidate from the distorted image; using a predetermined electronic watermark detection method, judging whether the patch candidate in the distorted image adequately correlates with a neighboring patch in the original image; when the judging indicates an adequate correlation, outputting a part of the electronic watermark.

16 Claims, 5 Drawing Sheets

FIG. 1 BACKGROUND ART
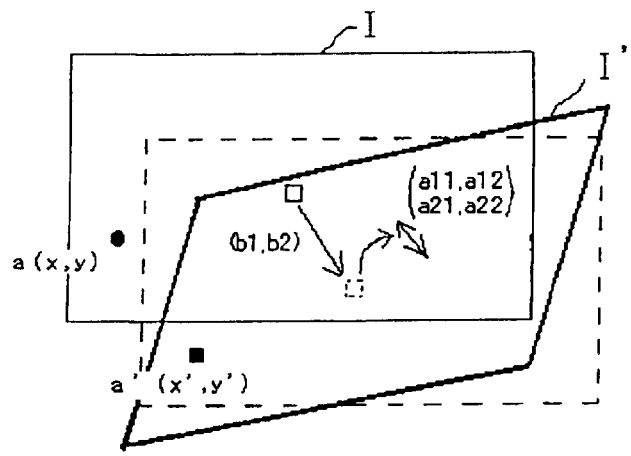
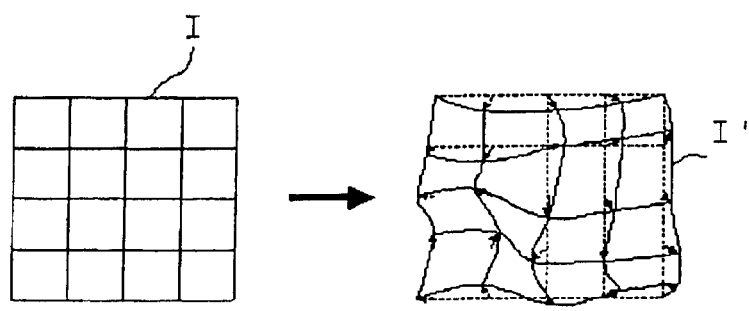
FIG. 2 BACKGROUND ART

ELECTRONIC WATERMARK DETECTION APPARATUS AND METHOD

CROSS-REFERENCE TO RELATED APPLICATION

This application is based upon and claims the benefit of priority under 35 U.S.C. §119 to Japanese Patent Application No. 2000-192358, filed Jun. 27, 2000, the entire contents of which are incorporated herein by reference.

BACKGROUND OF THE INVENTION

1. Field of the Invention

The present invention relates to electronic watermark detection apparatus and methods. More specifically, the invention relates to apparatus and methods for detecting electronic watermarks in digital documents, even if the content of the digital documents has been subjected to distortion or other attempts to hide or destroy the watermarks.

2. Discussion of the Background

In recent years, electronic digital content, such as sound, music, active movies, and still pictures, have come to circulate widely. Much digital content is protected under copyright. In order to protect the copyright of the digital content, various electronic watermark methods are used.

An electronic watermark method comprises embedding an electronic watermark within the digital content so that detecting and extracting the digital watermark is difficult. According to the intended use, the electronic watermark indicates identification information of a copyright person or a user, rights information of a copyright owner, use conditions, secret information required at the time of use, copy control information, and so on.

The digital content in which the electronic watermark is embedded is often geometrically distorted by various normal operations of a user, or by intentional attack. As an example of user's normal operations, there is a change of the display size of an image. As an example of intentional attack of the user, there is a distortion of an image.

With regard to the electronic watermark method, it is required that the electronic watermark does not disappear, is not altered, and is able to be extracted, even if geometrical distortion is provided to the digital content. The requirement is called robustness.

Generally, geometrical distortion is classified into global distortion and local distortion.

Global distortion is distortion of a whole image, and may be caused by scaling, rotating, and/or parallel displacing. Global distortion can be expressed as an affine transformation formula. FIG. 1 illustrates how an original image I becomes a distorted image I' by global distortion. A point a(x, y) of the original image I is displaced to a point a'(x', y') of the distorted image I' by global distortion. In this case, scaling and rotating can be expressed with four parameters, each being a component a11, a12, a21, and a22 of a 2×2 matrix. Parallel displacing can be expressed with two parameters (b1, b2). Therefore, global distortion can be expressed with the following formula with these six parameters a11, a 12, a21, a22, b1 and b2.

$$\begin{pmatrix} x' \\ y' \end{pmatrix} = \begin{pmatrix} a_{11} & a_{12} \\ a_{21} & a_{22} \end{pmatrix} \begin{pmatrix} x \\ y \end{pmatrix} + \begin{pmatrix} b_1 \\ b_2 \end{pmatrix} \quad (1)$$

On the other hand, local distortion means distortion in which each pixel of the whole original image is displaced by a different 2-dimensional vector. FIG. 2 shows that an original image I becomes a distorted image I' by local distortion. Therefore, local distortion can be expressed with the following formula as 2-dimensional generalized-coordinate conversion.

$$\begin{pmatrix} x' \\ y' \end{pmatrix} = \begin{pmatrix} f(x, y) \\ g(x, y) \end{pmatrix} \quad (2)$$

where functions f and g are arbitrary functions. Although geometrical distortion may also include clipping, for brevity its description is not specifically included here.

The position of each pixel of the distorted image provided by geometrical distortion displaces the position of each pixel of an original image. An example of a detection method of electronic watermarks with consideration to displacing position of a pixel is shown in U.S. Pat. No. 6,108,434 (Cox et al.).

The Cox et al. method finds a best corresponding shifting position by repeatedly comparing with a predetermined block of an original image, while shifting a position of a block of a distorted image little by little on the basis of the position of the predetermined block of the original image. If the distorted image is shifted based on the best corresponding shifting position, the distorted image is concluded to correspond to the original image. Thereby, the shifting position of the distorted image corresponding to a original image can be compensated, and the electronic watermark in the distorted image can then be detected.

The Cox et al method involves a large computational load for arithmetic calculations, since it is necessary to search for a large number of possible shifting positions. With regard to global distortion, as just to find the shifting position of a single arbitrary block, the Cox et al. method is considered to be an effective resolution method.

The geometrical distortion that a user performs on an image is local distortion in many cases. In practice, it is difficult to detect the shifting position of each pixel by local distortion.

In local distortion, since vectors of neighboring pixels are almost the same, neighboring pixels can be treated as a small block unit. Even if local distortion is treated as a small block unit, it is difficult in practice since the number of candidate block positions is a large and processing time becomes huge when using the Cox et al. method.

As explained above, a method for detecting electronic watermarks on local distorted images is not believed to be provided by known systems.

SUMMARY OF THE INVENTION

According to embodiments of the present invention, a method of determining a correspondence between patches in an original image having n patches, and patches in a distorted image that constitutes the original image distorted in accordance with local distortion, is provided. The method involves inputting predetermining affine parameters of one of the plurality of predetermined patches; setting the input predetermining affine parameters of the one of the plurality of patch as initial affine parameters for investigating a new patch; and investigating a correspondence of the new patch of the distorted image and the new patch of the original image by slightly modifying the set input predetermining affine parameters.

The invention also provides an embodiment of a method of determining a correspondence between patches in an original image having n patches, and patches in a distorted image that constitutes the original image distorted in accordance with local distortion. Embodiments of this method involve inputting predetermining affine parameters of an m-th patch for determining an (m+1)-th patch, wherein 1<m<n; setting the input predetermining affine parameters of the m-th patch as initial affine parameters for investigating the (m+1)-th patch; and investigating a correspondence of the (m+1)-th patch of the distorted image and the (m+1)-th patch of the original image by slightly modifying the input predetermining affine parameters.

The invention further provides an embodiment of a method of detecting an electronic watermark in a distorted image that constitutes a distortion of an original image in which the electronic watermark is embedded. This method involves inputting the distorted image and comparison information, the comparison information including at least one of the original image or information used for embedding the electronic watermark; dividing a domain of the original image into a plurality of patches, based on the comparison information; inputting affine parameters of a predetermined patch from among the patches in the original image; on the basis of the affine parameters, extracting a patch candidate from the distorted image; using a predetermined electronic watermark detection method, judging whether the patch candidate in the distorted image adequately correlates with a neighboring patch in the original image that neighbors the predetermined patch; and when the judging indicates an adequate correlation, outputting a part of the electronic watermark obtained by the predetermined electronic watermark detection method.

BRIEF DESCRIPTION OF THE DRAWINGS

FIG. 1 shows an original image I distorted to an image I' in response to global distortion;

FIG. 2 shows an original image I distorted to an image I' in response to local distortion;

DETAILED DESCRIPTION OF THE EMBODIMENTS

With reference to the accompanying drawings, the embodiments of the present invention are explained in detail hereafter. The principle of the embodiments of the present invention is first explained as follows.

In local distortion, since vectors of neighboring pixels are almost the same, neighboring pixels can be treated as a patch. A distorted image displaced by local distortion can be expressed by two functions, such as formula (2). Therefore, investigating correspondence relations (correlation) between pixels in an original image and pixels in a distorted image is difficult, because it is necessary to investigate all possible correspondence relationships.

Extreme distortion greatly spoils an impression of the original image and reduces its value. To keep the impression of the original image, the original is deformed little.

Figure 3:
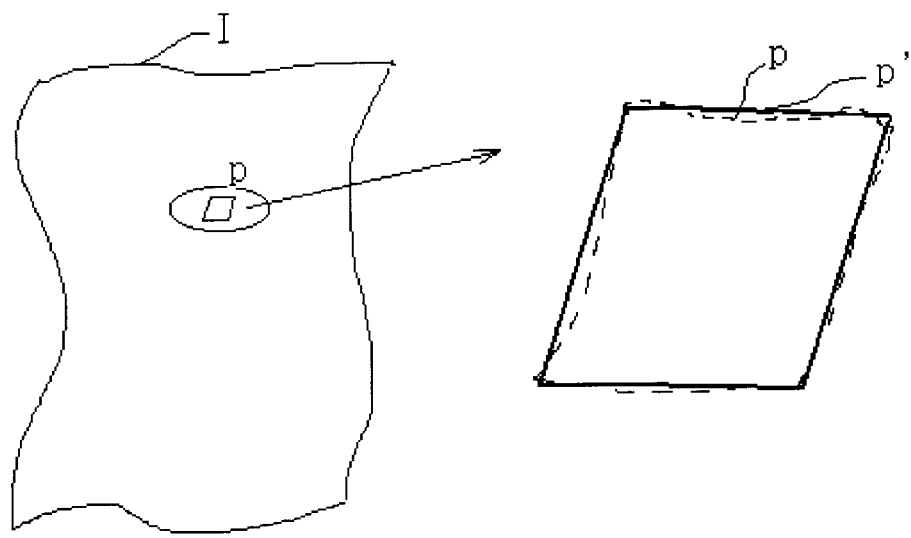
FIG. 3 is a view of explaining a patch p in an image I by provided local distortion.

When an image is distorted for the purpose of altering or destroying an electronic watermark, the patch of the distorted image can be regarded as a linear transformation. As shown FIG. 3, a patch p in an original image I displaced by local distortion can approximate a patch p' in a distorted image I' displaced by global distortion. The approximation is equivalent to the linear approximation of the two functions f and g. That is, it is expressed with the following formulas when two functions are approximated around a certain point (x, y) in an original image.

$$f(x+\epsilon_x, y+\epsilon_y) \approx f(x,y)+\epsilon_x f_x(x,y)+\epsilon_y f_y(x,y),$$

$$g(x+\epsilon_x, y+\epsilon_y) \approx g(x,y)+\epsilon_x g_x(x,y)+\epsilon_y g_y(x,y) \quad (3)$$

where:

$a_{11}=f_x(x,y)$, $a_{12}=f_y(x,y)$, $a_{21}=g_x(x,y)$, $a_{22}=g_y(x,y)$, $b_1=f(x,y)$, $b_2=g(x,y)$

Then, formula (3) can be expressed as a formula of an affine transformation.

Figure 4:
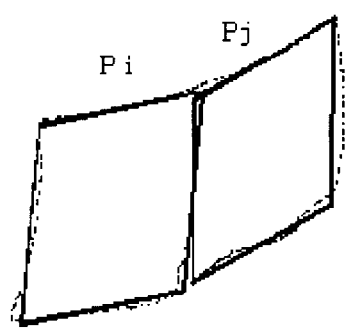
FIG. 4 is a view of the relation between a patch pi and a patch pj.

Next, it is defined that image I is equivalent to sum of a patch p1 and a patch pn. As shown in FIG. 4, a patch pi and a neighboring patch pj are deformed by local distortion. Each patch pi and pj has affine parameters of equation (4) by linear approximation around each starting point:

$$a^{(i)}_{\mu\nu}, b^{(i)}_{\mu} (i=1, \ldots n, \mu=1,2, \nu=1,2) \quad (4)$$

It can express by formula (5) between two patches pi and pj.

$$a^{(i)}_{\mu\nu}=a^{(j)}_{\mu\nu}+\delta^{(i,j)}_{\mu\nu},$$

$$b^{(i)}_{\mu}=b^{(j)}_{\mu}+\Delta^{(i,j)}_{\mu}+\delta^{(i,j)}_{\mu} \quad (5)$$

Here, $$\begin{pmatrix} \Delta^{(i,j)}_1 \\ \Delta^{(i,j)}_2 \end{pmatrix} = \begin{pmatrix} a^{(j)}_{00} & a^{(j)}_{01} \\ a^{(j)}_{10} & a^{(j)}_{11} \end{pmatrix} \begin{pmatrix} \Delta x^{(i,j)} \\ \Delta y^{(i,j)} \end{pmatrix} \quad (6)$$

where $\Delta x^{(i,j)}$, $\Delta y^{(i,j)}$ are gaps between each two patches of each original image.

The mapping of the affine parameters of the patch pi and the patch pj is expressed with six parameters of equation (7):

$$\delta^{(i,j)}_{\mu\nu}, \delta^{(i,j)}_{\mu} \quad (7)$$

Since these parameters are near zero, it can efficiently determine the optimum parameters by preferentially searching near zero.

As explained above, an original image is divided into patches. A distorted image is equivalent to a sum of patches. A patch of the distorted image, expressed using affine parameters, may be correlated to a patch in the original image. Patches neighboring a given patch may be sought by slightly modifying the given patch's affine parameters as a center point or starting point. For example, if the given patch's affine parameters are (1,1,1,1,1,1), then neighboring patches may be sought by using slightly-modified affine parameters such as (2,1,1,1,1,1), (1,2,1,1,1,1), (1,1,2,1,1,1), (1,1,1,2,1,1), and so forth.

By using the above approach, searches of digital watermarks may be made at higher speeds. On the basis of the above principles, the embodiments of the invention are explained as below.

Figure 5:
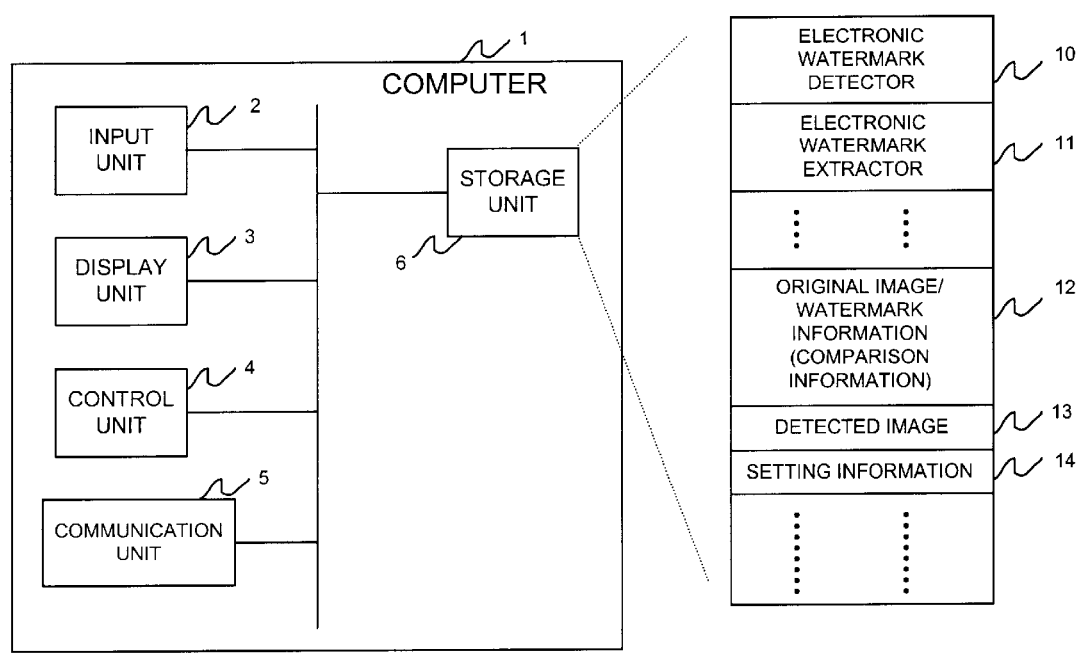
FIG. 5 is a system block diagram of an embodiment of the present invention.

FIG. 5 shows a computer system implementing an exemplary embodiment.

The computer system 1, such as a personal computer or a server computer, comprises an input unit 2 such as a mouse and a keyboard, a display unit 3, a control unit 4 comprising a microprocessor for controlling the whole computer and for processing software programs such as an electronic watermark detector 10 and electronic watermark extractor 11, etc., a communication unit 5 for communicating to external devices (not shown), and a storage unit 6 such as a semiconductor memory unit, hard disk drive unit, or CD/DVD drive unit. Storage unit 6 stores an operating system program as well as software programs including:

electronic watermark detector 10, electronic watermark extractor 11, comparison information 12 used for a detection of digital watermarks, a detected image 13 in which is embedded an electronic watermark, various settings 14 used by electronic watermark detector 10 and electronic watermark extractor 11, and other programs or information as may be needed for a particular embodiment.

Comparison information 12 may include one or more of:

an original image in which is embedded an electronic watermark, an image of an electronic watermark, information indicating a domain of an original image, a random number sequence used for embedding the electronic watermark in the original image, and other information as may be needed for a particular embodiment.

Figure 6:
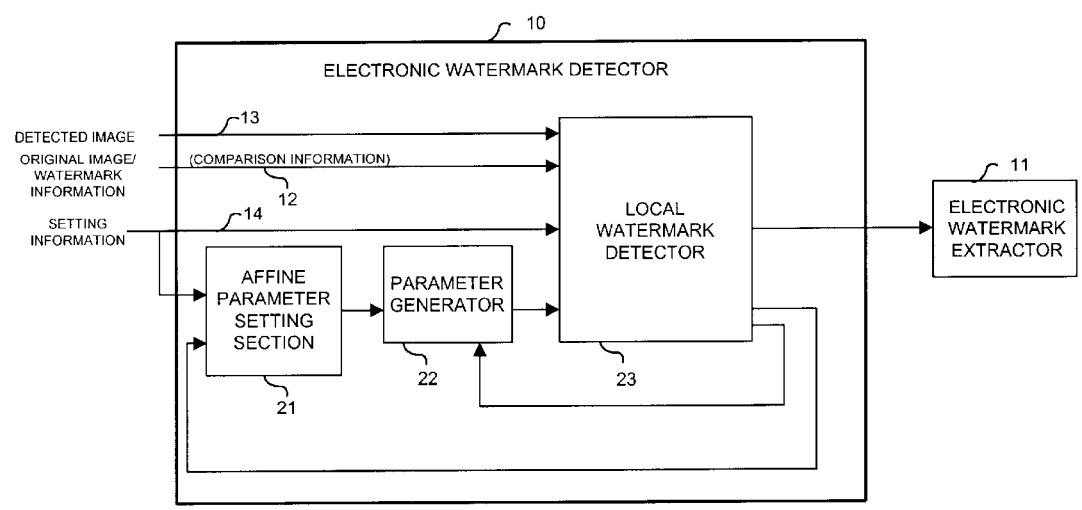
FIG. 6 is a functional block diagram of an electronic watermark detector 10 and watermark extractor 11 (FIG. 5)

FIG. 6 is a functional block diagram of the electronic watermark detector 10 and the electronic watermark extractor 11 according to an embodiment.

Electronic watermark detector 10 includes an affine parameter setting section 21, a parameter generator 22, and a local watermark detector 23. Electronic watermark detector 10 may sometimes be referred to as a "patch" electronic watermark detector to distinguish it from "local" watermark detector 23.

Electronic watermark detector 10 inputs a detected image 13, comparison information 12, as well as setting information 14. Setting information 14 may included, for example:

patch size, patch position, affine parameters of the patch, and other information as may be needed for a particular embodiment.

Electronic watermark detector 10 then outputs to electronic watermark extractor 11, a result of detecting part of the electronic watermark embedded in the detected image.

The electronic watermark detector 10 divides a domain of the original image into a plurality of patches, with the setting information 14, the input patch size and comparison information 12. In order to extract each patch of the detected image 13 corresponding to each the divided patches, it judges by detecting the part of the electronic watermark in one of several patch candidates that are sequentially generated on the basis of the detected image 13. Patch candidates are generated by using the formula of an affine transformation, using affine parameters of a previously-determined neighboring patch as a starting point. Whether the generated patch candidate includes part of the electronic watermark is judged. If part of the electronic watermark is included in the patch candidate, the patch candidate is determined as a patch. If part of the electronic watermark is not included in the patch candidate, a new patch candidate is generated by changing the affine parameters a little. By repeating above process for all patches p1 to pn, the electronic watermark of the detected image is detected.

The affine parameter setting section 21 sets up affine parameters for a start patch, and helps to detect a part of an electronic watermark later in the process. If detecting the part of the electronic watermark from a given patch of the detected image, the affine parameter setting section 21 outputs the affine parameters of the given patch received from setting information 14. Later, when detecting part of the electronic watermark from other patches, the affine parameter setting section 21 outputs affine parameters received from the local watermark detector 23 (see loopback path leading from local watermark detector 23 to affine parameter setting section 21 in FIG. 6). The affine parameters include the six parameters explained previously.

The parameter generator 22 updates each the affine parameters input from affine parameter setting section 21 by a predetermined updating technique, generates new affine parameters, and outputs the newly-generated affine parameters to local watermark detector 23. In the affine parameter update technique, whenever receiving a parameter request from the local watermark detector 23 on the basis of the affine parameters which set up from the affine parameter setting section 21, it preferably changes parameters little by little.

Local watermark detector 23 extracts a patch candidate from the detected image 13 based on the affine parameters input from the parameter generator 22. Local watermark detector 23 judges whether the patch candidate should be extracted as a patch. When it should be extracted, the result detected from the patch is output to the electronic watermark extractor 11, and the affine parameters at that time are output to the affine parameter setting section 21.

The details of local watermark detector 23 are explained below.

Local watermark detector 23 inputs setting information 14 for specifying each patch, the detected image 13 and the comparison information 12, at the time of the first stage. For example, the setting information 14 comprise a patch size shown by vertical x side and position of each patch, in case of a rectangular patch. Also, local watermark detector 23 calculates the formula of an affine transformation, and divides the domain of the original image into a plurality of patches on the basis of the patch size.

The division into patches by local watermark detector 23 is based on the domain of the image before, rather than after, local distortion. That is, the local watermark detector 23 extracts the domain of the original image before local distortion. Generally, the domain is a rectangle. The extracted domain is substituted and changed into the formula of the affine transformation using the affine parameters input from parameter generator 22.

The part of the distorted image that is clipped by the changed domain is a patch candidate. The patch candidate is judged by a predetermined method to be either true or false.

If it is true only, the patch candidate corresponds to a rectangular area of patch before local distortion.

Methods of judging whether a patch candidate is true or false include the following four exemplary methods.

1. First judgment method:

Each (rectangle) patch of the comparison information 12 is obtained beforehand by dividing the comparison information 12 into the input patch size.

Each pixel value of the corresponding (rectangle) patch is subtracted from each pixel value of the patch candidate of the detected image.

If each pixel value of the subtracted result is close to zero, then the patch candidate is judged "true;" otherwise it is judged to be "false."

When performing the first judgment method, comparison information 12 preferably contains at least one of an original image in which is embedded an electronic watermark, or an electronic watermark image itself.

2. Second judgment method:

A domain of a patch after distortion is determined by using the input setting information 14 and affine parameters of a detected patch.

The pixel value of the pixel in the patch before distortion is calculated from the pixel value of the pixel in the determined domain after distortion.

A correlation value between the calculated pixel value and a random number sequence used to embed an electronic watermark is calculated.

If the correlation value is larger than the predetermined threshold, the patch candidate is judged "true;" otherwise it is judged "false."

When performing the second judgment method, comparison information 12 preferably contains the random number sequence used to embed the electronic watermark.

3. Third judgment method: This method is applied when an electronic watermark is embedded using frequency domain techniques.

The patch candidate after local distortion and the patch before local distortion are changed into the frequency domain by, for example, a Fourier transformation.

The difference between each frequency component of the patch area and each frequency component of the patch candidate are added (integrated).

If the result of adding (integration) is smaller than the predetermined threshold, then the patch candidate is judged "true;" otherwise it is judged "false."

When performing the third method, comparison information 12 preferably contains either the original image or the electronic watermark image.

4. Fourth judgment method: Like the third method, the fourth method is applied when an electronic watermark is embedded using frequency domain techniques.

The value of the each pixel in the patch before distortion is calculated from the value of each pixel of the patch candidate, and the obtained pixel values are changed into the frequency domain by, for example, Fourier transformation.

A correlation value between a value of the changed frequency component and a random number sequence used at the time of embedding of an electronic watermark is calculated.

If the correlation value is larger than the predetermined threshold, then the patch candidate is judged "true;" otherwise it is judged "false."

When performing the fourth judgment method, the comparison information 12 preferably contains the random number sequence used at the time of embedding of the electronic watermark.

Of course, the invention contemplates use of judgment methods, other than the four methods explained above.

When judged true by the foregoing methods, the patch candidate is judged to correspond to domain local distortion, and simultaneously, it also is judged that a digital watermark is embedded. On the other hand, when judged false, it means that the patch candidate does not correspond to domain local distortion.

In order to extract a new patch candidate, local watermark detector 23 cancels a previous patch candidate and requires generation of new parameters by parameter generator 22. Thereby, the parameter generator 22 generates new affine parameters, and outputs the generated affine parameters to local watermark detector 23. By repeating the above processes, the right patch of a detected image corresponding to a patch before local distortion is extracted.

In addition, in an actual system, the maximum number of times the process should be repeated in a search of one patch is predetermined. When a patch is detected before the maximum number of times, as the patch candidate is output as a patch to the electronic watermark extractor 11, affine parameters from the corresponding patch are output to the affine parameter setting section 21.

On the other hand, even if the number of times reaches the maximum, when a patch is undetectable, it considers that the patch candidate generated with the first affine parameters to be a patch, and is output as a patch to the electronic watermark extractor 11, and the first affine parameters are output to the affine parameter setting section 21. Alternatively, it may consider that the patch candidate by whom the largest (integration) result or correlation value were acquired is a patch, and the affine parameters may be output.

Furthermore, an indication that an electronic watermark has not been detected is output to the electronic watermark extractor 11. The output affine parameters are used as start parameters at the time of an extraction of a following and neighboring patch.

The electronic watermark extractor 11 stores the position information on the patch and whether the patch has a part of the electronic watermark, serially sent from the patch electronic watermark detector 10.

The electronic watermark extractor 11 extracts electronic watermark after all electronic watermarks on the detected image are detected.

Figure 7:
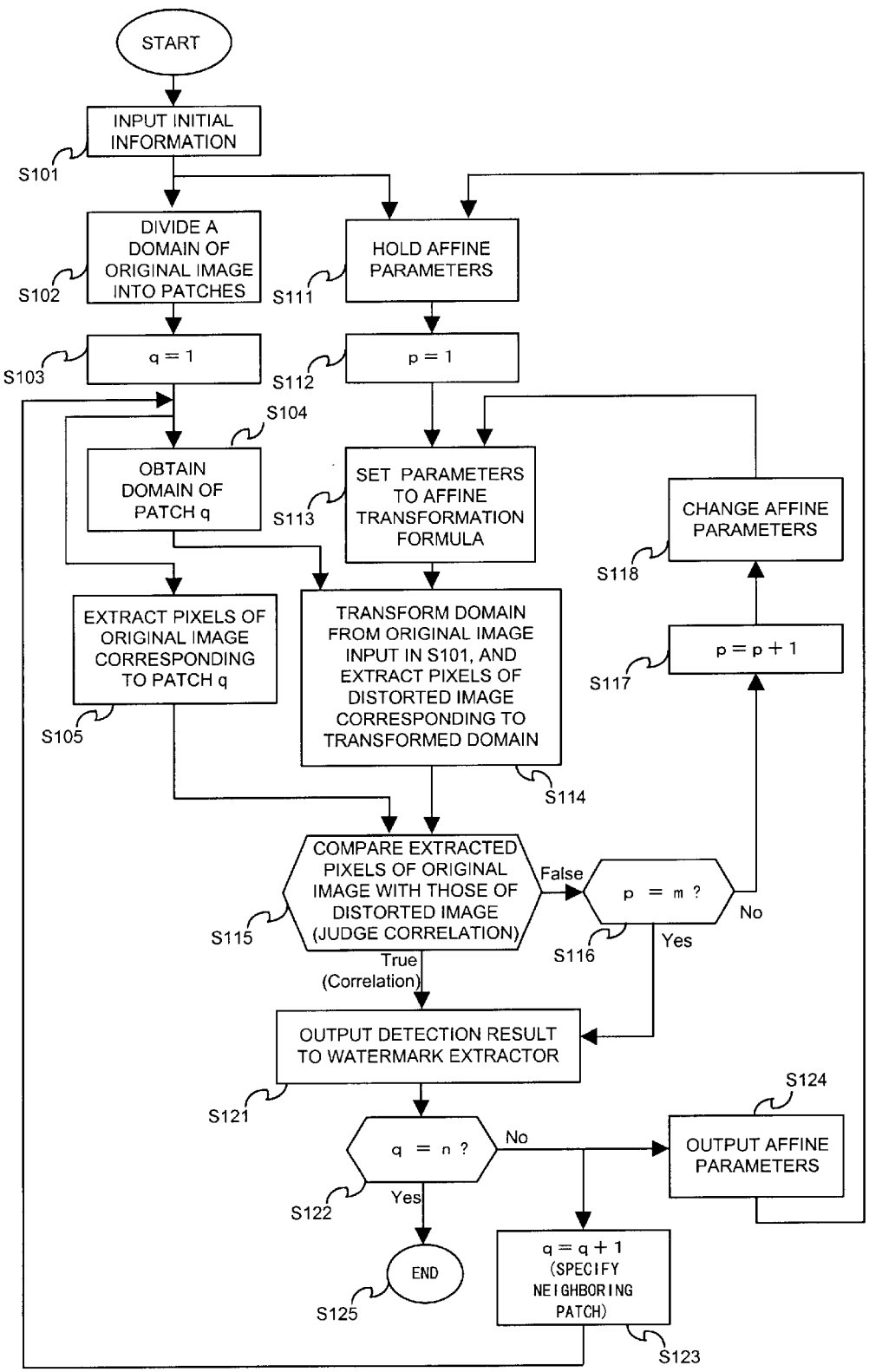
FIG. 7 is a flow chart showing an example of a processing sequence for the electronic watermark detector 10 (FIG. 5).

FIG. 7 shows a flow chart of an exemplary process executed by the patch electronic watermark detector 10. For purposes of this discussion of an example, it is assumed that the first patch candidate judgment method, described above, is used.

First, initial information is received (S101). The initial information includes the comparison information 12, the detected image 13, affine parameters of a patch, patch size, and so on. The patch size may be contained in the setting information 14, may be specified directly from an input unit 2 such as a keyboard, or may be determined automatically by indicating a number of partitions of the patch by a user. The affine parameters of the patch may be contained in the setting information 14, or may be input from the input unit 2 depending on a user's choice, or may be automatically initialized to "0" or some other suitable initial value.

Next, based on the input initial information, the domain of the original image obtained from the comparison information 12 is divided into patches. A serial number (index) q is given to each patch, beginning at "1" (S103) and incremented in ascending order (S123, described below).

The domain of the original image may be the original image itself, or it may be the electronic watermark image, or it may be a virtual domain that follows the form of an original image.

Next, it takes coordinates that indicate a domain of the original image's patch that is specified by counter value q (S104). Also, pixels of the original image patch specified by counter value q are extracted from the comparison information 12 (S105).

Meanwhile, the input affine parameters of the patch are held with the affine parameter setting section 21 (S111). And initial value p=1 is set to a counter (not shown) that shows the number of times P that the affine parameters change (S112).

Next, the held affine parameters are set to the formula of an affine transformation (S113). A domain changed by substituting the position of the domain of the patch extracted at step S104 using the formula of the affine transformation that set this affine parameter is obtained (S114), and pixels of a patch candidate are extracted from the domain obtained in the detected image.

Next, the pixels in the patch of the original image obtained at step S105 are compared (S115) to the pixels of the patch candidate obtained at the step S114, by the above first judgment method or other suitable method.

When judged "false" as a result of the comparison, it judges (S116) whether the counter has reached a value "m." Here, "m" is an upper limit of the number of times of repetition of extracting one patch from a patch candidate; when an adequately correlated patch is not found for whatever reason, the upper limit prevents searching infinitely. The value of "m" may be fixed internally, or may be specified at the time of initial information input (S101).

If p is not equal to M at step S116, counter value p is increased (S117), which increments the number p of affine parameter changes. The affine parameters are changed (S118) by only a small amount at one time, as explained with reference to FIG. 4. The changed affine parameters are involved in the performance of steps S113 and following.

When a patch is detected at step S115, or when a affine change counter value p reaches the limiting value at step S116, the detection result of the electronic watermark of the patch is output to the electronic watermark extractor 11 (S121). In the case of the former, the detected watermark is made into a detection result, and in the case of the latter, it should just output a patch with an indication that a watermark was not detected therein.

The process ends (S125) if it is judged (q=n in S122) that the extraction of all n patches was completed after a detection result output and all patches are detected.

If the extraction of all patches is not yet completed (q<n in S122), the patch number counter value q is incremented (S123), a neighboring patch is specified, and control passes back to step S104. Also, the affine parameters of the extracted patch are output (S124) as a starting point to search the neighboring patch, and control passes back to step S111. Since it is expected that affine parameters between neighboring patches are changed only a little each time (as explained with reference to FIG. 4), it is very effective to use these parameters as a starting point in the next iteration.

Although the above is an explanation of the processes of the patch electronic watermark detector 10 using the first judgment method, for example, when the second judgment method is used, "a random number sequence used for embedding the patch q is extracted" may instead of the step S105, "the correlation value between each area is calculated and it compares with threshold T" may instead of the step S115. The others steps may be same.

Also, when the third judgment method is used, "changing each area into a frequency domain, calculating the sum value of the difference, and comparing with threshold T (it differing from the above-mentioned T)" may substitute for step S115. The others steps may be same.

In addition, when still other judgment methods are used, the changed part according to the judgment technique does not deviate from the flow chart of FIG. 5. The same basic process is used.

Thus, the invention provides various embodiments.

According to embodiments of the present invention, a method of determining a correspondence between patches in an original image having n patches, and patches in a distorted image that constitutes the original image distorted in accordance with local distortion, is provided. The method involves inputting predetermining affine parameters of one of the plurality of predetermined patches; setting the input predetermining affine parameters of the one of the plurality of patch as initial affine parameters for investigating a new patch; and investigating a correspondence of the new patch of the distorted image and the new patch of the original image by slightly modifying the set input predetermining affine parameters.

The invention also provides an embodiment of a method of determining a correspondence between patches in an original image having n patches, and patches in a distorted image that constitutes the original image distorted in accordance with local distortion. Embodiments of this method involve inputting predetermining affine parameters of an m-th patch for determining an (m+1)-th patch, wherein 1<m<n; setting the input predetermining affine parameters of the m-th patch as initial affine parameters for investigating the (m+1)-th patch; and investigating a correspondence of the (m+1)-th patch of the distorted image and the (m+1)-th patch of the original image by slightly modifying the input predetermining affine parameters.

The invention further provides an embodiment of a method of detecting an electronic watermark in a distorted image that constitutes a distortion of an original image in which the electronic watermark is embedded. The method involves inputting the distorted image and comparison information, the comparison information including at least one of the original image or information used for embedding the electronic watermark; dividing a domain of the original image into a plurality of patches, based on the comparison information; inputting affine parameters of a predetermined patch from among the patches in the original image; on the basis of the affine parameters, extracting a patch candidate from the distorted image; using a predetermined electronic watermark detection method, judging whether the patch candidate in the distorted image adequately correlates with a neighboring patch in the original image that neighbors the predetermined patch; and when the judging indicates an adequate correlation, outputting a part of the electronic watermark obtained by the predetermined electronic watermark detection method.

The method can further involve updating the affine parameters to new affine parameters when the judging does not indicate an adequate correlation;, and possibly also extracting a new patch candidate from the distorted image, on the basis of the new affine parameters, and using the predetermined electronic watermark detection method, judging whether the new patch candidate from the distorted image adequately correlates to the neighboring patch in the original image.

The method can further involve storing the affine parameters as initial affine parameters for use in extracting new patch candidates when the judging indicates an adequate correlation.

The judging can involve subtracting pixels of the original image's patch from respective pixels of the distorted image's patch candidate; and if a difference of the pixel subtracting is smaller than a predetermined threshold, judging the adequate correlation to exist.

Alternatively, the judging can involve calculating pixel values of pixels in the patch before distortion, based on pixel values of a pixel in a determined domain in the distorted image; calculating correlation values between the calculated pixel values and a random number sequence used to embed the electronic watermark; and if the correlation values are larger than a predetermined threshold, judging the adequate correlation to exist.

Alternatively, the judging can involve transforming into the frequency domain, the patch candidate in the distorted image and the patch in the original image so as to produce patch candidate frequency components and original image patch frequency components; accumulating differences between respective patch candidate frequency components and original patch frequency components; and if a result of the accumulating of differences is smaller than a predetermined threshold, judging the adequate correlation to exist.

Alternatively, the judging can involve calculating values of pixels in the patch in the original image based on values of pixels of the patch candidate in the distorted image; transforming into the frequency domain, the calculated values of the pixels in the patch in the original image, so as to produce original image patch frequency components; calculating a correlation value between the original image patch frequency components and a random number sequence used to embed the electronic watermark; and if the correlation value is larger than a predetermined threshold, judging the adequate correlation to exist.

According to the above embodiments, electronic watermarks can be efficiently detected from detected images even if they have been subjected to local distortion. Moreover, the correspondence relation between sufficiently small domains can be easily found, both before and after local distortion. Then, since the processes of electronic watermark detection may be very high speed, application of the inventive method to actual products makes them very efficient.

According to the electronic watermark method and system explained above, even if local distortion is given to a picture image, the affine transformation that approximates the deformation locally can be found efficiently, and an electronic watermark can be restored.

Although the foregoing explanation focuses on still images, it is also envisioned to apply the embodiments to moving images. In that case, the patch may be in the same frame, or may be a patch in a former frame. If the patch is in a former frame, the embodiments of the invention may be used by considering that patches may be neighbors in time rather than merely neighbors in space.

Additional advantages and modifications will readily occur to those skilled in the art. Therefore, the invention is not limited to the specific details and representative embodiments shown and described herein. Accordingly, various modifications may be made without departing from the spirit or scope of the general inventive concept as defined by the appended claims and their equivalents.

What is claimed is:

1. A method of detecting an electronic watermark in a distorted image that constitutes a distortion of an original image in which the electronic watermark is embedded, the method comprising:

inputting the distorted image and comparison information, the comparison information including at least one of the original image or information used for embedding the electronic watermark;

dividing a domain of the original image into a plurality of patches, based on the comparison information;

inputting affine parameters of a predetermined patch from among the patches in the original image;

on the basis of the affine parameters, extracting a patch candidate from the distorted image;

using a predetermined electronic watermark detection method, judging whether the patch candidate in the distorted image adequately correlates with a neighboring patch in the original image that neighbors the predetermined patch; and when the judging indicates an adequate correlation, outputting a part of the electronic watermark obtained by the predetermined electronic watermark detection method.

2. The method of claim 1, further comprising:

updating the affine parameters to new affine parameters when the judging does not indicate an adequate correlation.

3. The method of claim 2, further comprising:

extracting a new patch candidate from the distorted image, on the basis of the new affine parameters; and using the predetermined electronic watermark detection method, judging whether the new patch candidate from the distorted image adequately correlates to the neighboring patch in the original image.

4. The method of claim 1, further comprising:

storing the affine parameters as initial affine parameters for use in extracting new patch candidates when the judging indicates an adequate correlation.

5. The method of claim 1, wherein the judging includes:

subtracting pixels of the original image's patch from respective pixels of the distorted image's patch candidate; and if a difference of the pixel subtracting is smaller than a predetermined threshold, judging the adequate correlation to exist.

6. The method of claim 1, wherein the judging includes:

calculating pixel values of pixels in the patch before distortion, based on pixel values of a pixel in a determined domain in the distorted image;

calculating correlation values between the calculated pixel values and a random number sequence used to embed the electronic watermark; and if the correlation values are larger than a predetermined threshold, judging the adequate correlation to exist.

7. The method of claim 1, wherein the judging includes:

transforming into the frequency domain, the patch candidate in the distorted image and the patch in the original image so as to produce patch candidate frequency components and original image patch frequency components;

accumulating differences between respective patch candidate frequency components and original patch frequency components; and if a result of the accumulating of differences is smaller than a predetermined threshold, judging the adequate correlation to exist.

8. The method of claim 1, wherein the judging includes:

calculating values of pixels in the patch in the original image based on values of pixels of the patch candidate in the distorted image;

transforming into the frequency domain, the calculated values of the pixels in the patch in the original image, so as to produce original image patch frequency components;

calculating a correlation value between the original image patch frequency components and a random number sequence used to embed the electronic watermark; and if the correlation value is larger than a predetermined threshold, judging the adequate correlation to exist.

9. A method of determining a correlation between a predetermined patch of an original image in which is embedded an electronic watermark, and a patch candidate of a distorted image that constitutes the original image distorted by local distortion, the method comprising:

inputting the distorted image and comparison information, the comparison information including at least one of the original image or information used for embedding the electronic watermark;

dividing a domain of the original image into a plurality of patches, based on the comparison information;

inputting affine parameters of a predetermined patch from among the patches in the original image;

on the basis of the affine parameters, extracting the patch candidate from the distorted image;

using a predetermined electronic watermark detection method, judging whether the patch candidate in the distorted image adequately correlates with a neighboring patch in the original image that neighbors the predetermined patch; and repeating the judging for all predetermined patches of the original image.

10. The method of claim 9, further comprising:

updating the affine parameters to new affine parameters when the judging does not indicate an adequate correlation.

11. The method of claim 10, further comprising:

extracting a new patch candidate from the distorted image, on the basis of the new affine parameters; and using the predetermined electronic watermark detection method, judging whether the new patch candidate from the distorted image adequately correlates to the neighboring patch in the original image.

12. The method of claim 9, further comprising:

storing the affine parameters as initial affine parameters for use in extracting new patch candidates when the judging indicates an adequate correlation.

13. The method of claim 9, wherein the judging includes:

subtracting pixels of the original image's patch from respective pixels of the distorted image's patch candidate; and if a difference of the pixel subtracting is smaller than a predetermined threshold, judging the adequate correlation to exist.

14. The method of claim 9, wherein the judging includes:

calculating pixel values of pixels in the patch before distortion, based on pixel values of a pixel in a determined domain in the distorted image;

calculating correlation values between the calculated pixel values and a random number sequence used to embed the electronic watermark; and if the correlation values are larger than a predetermined threshold, judging the adequate correlation to exist.

15. The method of claim 9, wherein the judging includes:

transforming into the frequency domain, the patch candidate in the distorted image and the patch in the original image so as to produce patch candidate frequency components and original image patch frequency components;

accumulating differences between respective patch candidate frequency components and original patch frequency components; and if a result of the accumulating of differences is smaller than a predetermined threshold, judging the adequate correlation to exist.

16. The method of claim 9, wherein the judging includes:

calculating values of pixels in the patch in the original image based on values of pixels of the patch candidate in the distorted image;

transforming into the frequency domain, the calculated values of the pixels in the patch in the original image, so as to produce original image patch frequency components;

calculating a correlation value between the original image patch frequency components and a random number sequence used to embed the electronic watermark; and if the correlation value is larger than a predetermined threshold, judging the adequate correlation to exist.

* * * * *